(12) United States Patent
Prabhu et al.

(10) Patent No.: US 10,511,483 B2
(45) Date of Patent: Dec. 17, 2019

(54) SECURELY ONBOARDING VIRTUAL MACHINES USING A CENTRALIZED POLICY SERVER

(71) Applicant: Extreme Networks, Inc., San Jose, CA (US)

(72) Inventors: Atul Prabhu, Bangalore (IN); Nishant Krishna, Bihar (IN); Biswajit Kanungo, San Jose, CA (US)

(73) Assignee: Extreme Networks, Inc., San Jose, CA (US)

( * ) Notice: Subject to any disclaimer, the term of this patent is extended or adjusted under 35 U.S.C. 154(b) by 281 days.

(21) Appl. No.: 15/162,488

(22) Filed: May 23, 2016

(65) Prior Publication Data

US 2017/0339018 A1 Nov. 23, 2017

(51) Int. Cl.
*G06F 15/177* (2006.01)
*H04L 12/24* (2006.01)
*G06F 21/12* (2013.01)
*G06F 9/455* (2018.01)

(52) U.S. Cl.
CPC ........ *H04L 41/0893* (2013.01); *G06F 21/121* (2013.01); *G06F 9/45533* (2013.01); *G06F 2221/033* (2013.01)

(58) Field of Classification Search
CPC . H04L 41/0893; H04L 67/327; G06F 21/121; G06F 2221/033
See application file for complete search history.

(56) References Cited

U.S. PATENT DOCUMENTS

| 8,230,480 B2 | 7/2012 | Fazal et al. | |
| 9,165,120 B1* | 10/2015 | Brandwine | G06F 21/00 |
| 9,838,391 B2* | 12/2017 | Jevans | H04L 63/1433 |
| 2014/0089922 A1* | 3/2014 | Lang | G06F 9/45558 718/1 |
| 2014/0317677 A1* | 10/2014 | Vaidya | H04L 63/20 726/1 |
| 2016/0105350 A1* | 4/2016 | Greifeneder | H04L 41/046 709/224 |
| 2017/0279826 A1* | 9/2017 | Mohanty | G06F 9/45558 |

* cited by examiner

*Primary Examiner* — Ryan J Jakovac
(74) *Attorney, Agent, or Firm* — Sterne, Kessler, Goldstein & Fox P.L.L.C.

(57) ABSTRACT

In some implementations, a method can include determining a virtual machine (VM) inventory baseline of a system, including identifying VMs in a baseline configuration and generating a VM fingerprint for each VM in the inventory baseline, and detecting a user onboarded VM and moving the user onboarded VM to a quarantine operating area for a period of time. The operational posture of the user onboarded VM can be compared to an operational posture policy of the system. When the operational posture of the user onboarded VM meets the operational posture policy of the system, the user onboarded VM is moved from the quarantine area to an operational area, and, when the operational posture of the user onboarded system does not meet the operational policy posture of the system and the period of time has expired, the user onboarded VM is terminated.

17 Claims, 5 Drawing Sheets

SECURELY ONBOARDING VIRTUAL MACHINES USING A CENTRALIZED POLICY SERVER

TECHNICAL FIELD

Embodiments relate generally to computer networks, and more particularly, to methods, systems and computer readable media for securely onboarding virtual machines using a centralized policy server.

BACKGROUND

With unification being a commonly sought after communications feature, many enterprises are offering turnkey unified communication solutions (e.g., Pod Fx by Avaya Inc.) that come pre-built and consolidate various communication applications into a unified solution.

With virtualization gaining traction, the various applications packaged in these unified turnkey solutions typically include virtual machines (or VMs). Based on the initial known requirements of a set of installed VMs, the memory, storage limits, posture settings and other system parameters are often configured at the factory to provide optimum performance.

However, currently there may exist few (if any) mechanisms to prevent a customer from installing any additional VMs on the turnkey unified system after it has been installed. There may also be no mechanism to ensure whether a VM meets the basic security posture requirements of the turnkey unified system.

Embodiments were conceived in light of the above mentioned needs, problems and/or limitations, among other things.

SUMMARY

One or more embodiments can include methods, systems and computer readable media for securely onboarding virtual machines using a centralized policy server. In some implementations, a method can include determining a virtual machine (VM) inventory baseline of a system, including identifying VMs in a baseline configuration and generating a VM fingerprint for each VM in the inventory baseline, and detecting a user onboarded VM. The method can also include moving the user onboarded VM to a quarantine operating area for a period of time, and assessing an operational posture of the user onboarded VM. The method can further include comparing the operational posture of the user onboarded VM to an operational posture policy of the system. The method can also include, when the operational posture of the user onboarded VM meets the operational posture policy of the system, moving the user onboarded VM from the quarantine area to an operational area, and, when the operational posture of the user onboarded system does not meet the operational policy posture of the system and the period of time has expired, terminating the user onboarded VM.

The method can further include, when the operational posture of the user onboarded VM meets the operational posture policy of the system, updating the inventory baseline to include the user onboarded VM and a fingerprint of the user onboarded VM. Assessing the operational posture of the user onboarded VM can include assigning a posture assessment agent to the user onboarded VM and receiving posture assessment information from the posture assessment agent.

The method can also include determining an available maximum number of VMs permitted in the system according to a license and determining a current number of VMs in the system, and when the number of VMs in the system is equal to or above the maximum number of VMs permitted, preventing the user onboarded VM from being moved from the quarantine area to the operational area.

Some implementations can include a system comprising one or more processors coupled to a nontransitory computer readable medium having stored thereon on software instructions that, when executed by the one or more processors, cause to perform operations. The operations can include determining a virtual machine (VM) inventory baseline of a system, including identifying VMs in a baseline configuration and generating a VM fingerprint for each VM in the inventory baseline, and detecting a user onboarded VM. The operations can also include moving the user onboarded VM to a quarantine operating area for a period of time, and assessing an operational posture of the user onboarded VM. The operations can further include comparing the operational posture of the user onboarded VM to an operational posture policy of the system.

The operations can also include, when the operational posture of the user onboarded VM meets the operational posture policy of the system, moving the user onboarded VM from the quarantine area to an operational area, and, when the operational posture of the user onboarded system does not meet the operational policy posture of the system and the period of time has expired, terminating the user onboarded VM.

The operations can further include, when the operational posture of the user onboarded VM meets the operational posture policy of the system, updating the inventory baseline to include the user onboarded VM and a fingerprint of the user onboarded VM. Assessing the operational posture of the user onboarded VM can include assigning a posture assessment agent to the user onboarded VM and receiving posture assessment information from the posture assessment agent.

The operations can also include determining an available maximum number of VMs permitted in the system according to a license and determining a current number of VMs in the system, and, when the number of VMs in the system is equal to or above the maximum number of VMs permitted, preventing the user onboarded VM from being moved from the quarantine area to the operational area.

Some implementations can include a nontransitory computer readable medium having stored thereon software instructions that, when executed by one or more processors, cause the one or more processors to perform operations. The operations can include determining a virtual machine (VM) inventory baseline of a system, including identifying VMs in a baseline configuration and generating a VM fingerprint for each VM in the inventory baseline, and detecting a user onboarded VM. The operations can also include moving the user onboarded VM to a quarantine operating area for a period of time, and assessing an operational posture of the user onboarded VM. The operations can further include comparing the operational posture of the user onboarded VM to an operational posture policy of the system.

The operations can also include, when the operational posture of the user onboarded VM meets the operational posture policy of the system, moving the user onboarded VM from the quarantine area to an operational area, and, when the operational posture of the user onboarded system does not meet the operational policy posture of the system and the period of time has expired, terminating the user onboarded VM.

The operations can further include, when the operational posture of the user onboarded VM meets the operational posture policy of the system, updating the inventory baseline to include the user onboarded VM and a fingerprint of the user onboarded VM. Assessing the operational posture of the user onboarded VM can include assigning a posture assessment agent to the user onboarded VM and receiving posture assessment information from the posture assessment agent.

The operations can also include determining an available maximum number of VMs permitted in the system according to a license and determining a current number of VMs in the system, and, when the number of VMs in the system is equal to or above the maximum number of VMs permitted, preventing the user onboarded VM from being moved from the quarantine area to the operational area.

In any of the above-mentioned implementations, the quarantine area can include resources that are limited compared to the resources provided by the operational area. The fingerprint can be based on one or more of the following: VM ID, UUID, MAC address, and a VM operational parameter.

DETAILED DESCRIPTION

Figure 1:
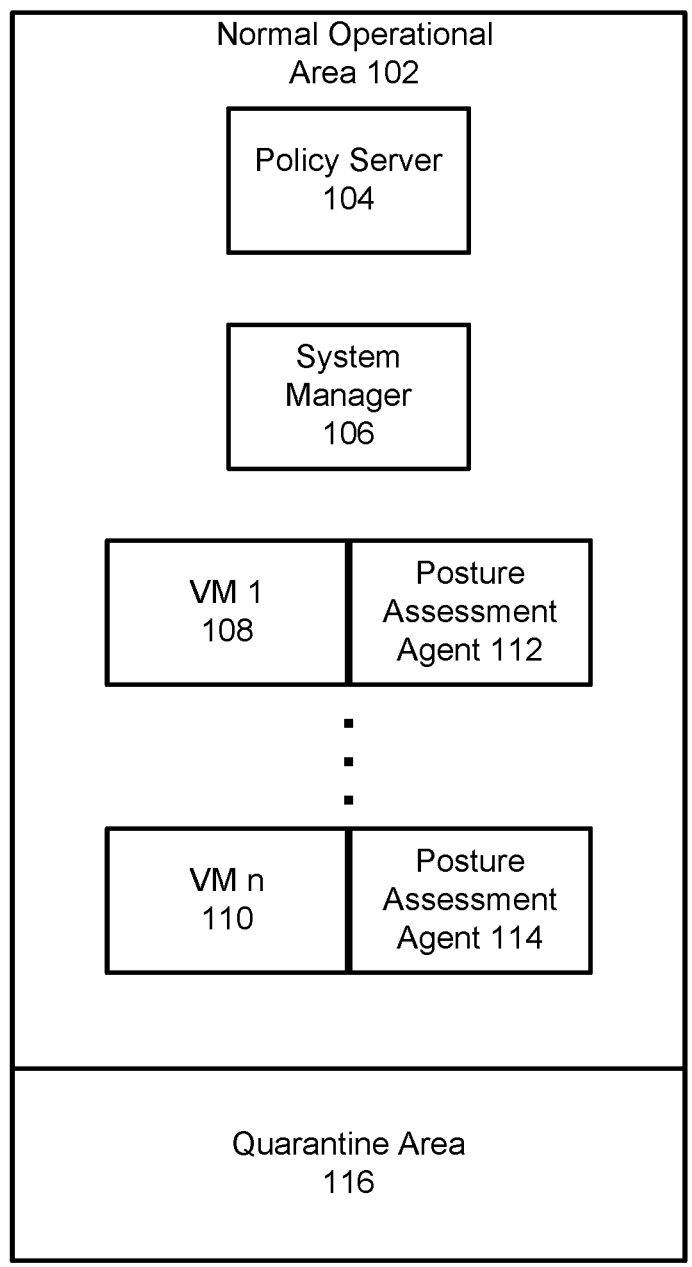
FIG. 1 is a diagram of an example unified system in accordance with at least one implementation.

The Pod Fx by Avaya is described herein as an example turnkey unified solution, but it will be appreciated that systems, methods and computer readable media described herein can be used with any suitable unified system that includes virtualized applications or machines as part of the deployment. Further, unified communications solutions are described as examples for illustration purposes. It will be appreciated that the systems, methods and computer readable media described herein are applicable to other systems/solutions such as those configured for contact centers, etc. For example, the Pod Fx can include various configurations such as UCaaS (Unified Communication as a Service), CCaaS (Contact Center as a Service) and Enterprise Pod and an implementation of the disclosed subject matter can be configured and/or tailored for these configurations and others.

In general, some implementations can include a method for securely onboarding virtual machines using a centralized policy server. The method can include one or more steps for baseline creation, posture assessment, and activation.

Baseline creation can include computing a first baseline of a unified system (e.g., a Pod Fx) when the system is first started. The baseline computation can be performed by a centralized unified system management application (e.g., Avaya Pod Visualization Manager (PVM) or the like). Baseline computation can include determining the VM inventory of the system and can include storing encoded information about VMs which can be used to verify their unique identity, e.g., a UUID of the VM and a "fingerprint" of the VM. The fingerprint can be calculated based on resources used by the VM. In some implementations, the fingerprint can contain information derived from software running on the VM (e.g., Avaya-proprietary software running on the VM). For example, the fingerprint can include a mix of various properties of the VM in a combination that will help make the fingerprint unique to that VM. The following is an example formula for a VM fingerprint:

VM Fingerprint=HashOf((VM ID)*MAC+(VM ID)*UUID+IntegerOf(#vCPUs*Memory allocated in MB)), where HashOf is a hash function, VM ID is an identification number assigned to the VM by the VM system manager (e.g., PVM), MAC is media access control address, UUID is a Universal Unique Identifier and can include a number (e.g., a 128-bit number) used to uniquely identify some object or entity on the Internet, #vCPUs is the number of virtual CPUs allocated to the VM. The components of the VM fingerprint can be varied from the above, especially the #vCPUs and the memory components.

The baseline can also capture the posture settings (e.g., settings such as anti-virus, anti-spyware, firewall settings, etc.) on each VM.

The posture assessment can include determining basic security posture settings (e.g., firewall being turned on, anti-virus being installed, etc.), which may need to be met. Manufacturers typically ensure these settings are met for the default VMs that ship with a system. Any newly added VMs may be required to meet the basic security posture settings and any VMs that cannot meet the basic security posture settings will be moved to a quarantine network which may have limited access to other resources (e.g., no access to existing VMs on the Pod Fx). In order to obtain the posture settings, some implementations can include a custom agent (e.g., an Avaya Posture Assessment (APA) Agent) which needs to run on any newly added VM. This agent can be configured to collect required posture settings and passes the settings to the PVM, which, in turn, uses this information in the activation process for the newly added VM.

In some implementations, a management application (e.g., PVM) communicates with a policy server to determine the activation state of each of the VMs within the system (e.g., Pod Fx). The activation state information can be used for a periodic audit of the system. This process can also get triggered whenever a new VM is added to the Pod Fx after the initial baseline is created. As mentioned above, any newly added VM may run for a given time period (a "grace period") in a quarantine network until the management system (e.g., PVM) determines the quarantined VM's activation status. An administrator can be notified about the absence of a posture agent (e.g., Avaya Posture Assessment Agent) on the newly added VM and suitable root/admin permission is queried to install this agent.

In some implementations, the following information is sent to a policy server by the management system (e.g., PVM) to query for activation status:

1) Unique identity of the VM;
2) Posture settings of the VM (e.g., obtained from the APA Agent);
3) Number of Active VMs allowed based on the license; and
4) Number of Active VMs currently present In response, the policy server may respond with the following information:

1) Status: Allow, Deny (and optional reason for denial); and

2) Remaining activations possible: A number which says how many more VMs can still be activated to the Pod Fx Once the response is received by PVM, the PVM can do one of the following:

a) If the response is Allow, the PVM continues with the activation of VM. The Baseline maintained by PVM is now updated with the information of this new VM.

b) If the response is Deny, PVM may not activate the VM on the Pod Fx and may move the VM to the quarantine network (if not moved already). Possible operations are running the VM in grace period for a pre-defined amount of time or shutting down the VM. A notification can also be sent to the vendor indicating that the customer has bypassed the recommended guidelines.

The PVM can use the "Remaining Activation Possible" number to show an indication on the UI so that the customer would know how many more VMs can be activated. For example, if a customer has bought a "small" license pack having a capacity of 20 VMs and currently has only 15 active VMs. He/she can freely add and activate another 5 VMs till the capacity of 20 is reached. Once this number is reached, the Customer can register the 21st VM but will not be able to activate it. In the absence of activation, the PVM (which periodically communicates with the Policy Server to determine the activation status of each VM) can decide to bring this VM down or take any other appropriate vendor defined action.

The process to allow activation of this new VM is straight forward. The customer just needs to buy an additional license pack (e.g., a "lite" pack) that gives him/her the option of activating additional VMs (e.g., 5 in the case of the lite pack).

The licensing mechanism on the Pod Fx can also be configured to permit the customer to selectively activate/deactivate VMs (except default baseline VMs) and that will dynamically reflect on the status of the activated VM count on the Pod Fx.

FIG. 1 is a diagram of an example unified system 100 in accordance with at least one implementation. The system 100 (e.g., a Pod Fx or the like by Avaya) includes a normal operational area 102 having a policy server 104, a system manager 106, one or more factory installed (or baseline) VMs (108-110) having corresponding posture assessment agents (112-114) and a quarantine area (or network) 116. For example, in an Avaya unified system, the factory baseline VMS can include one or more of the following: VMs from the Avaya Aura suite, VMs for network management, vCenter VM for management of vSphere infrastructure, SAL Gateway for remote access, and a Management Server Console for various management and maintenance activities.

In operation, the system 100 may have been configured at the factory to operate the VMs (108-110) with optimal (or near optimal) performance and in a secure manner. The system manager 106 (e.g., Avaya Pod Visualization Manager) provides a visualization and management of the VMs (108-110) within the system 100.

Figure 2:
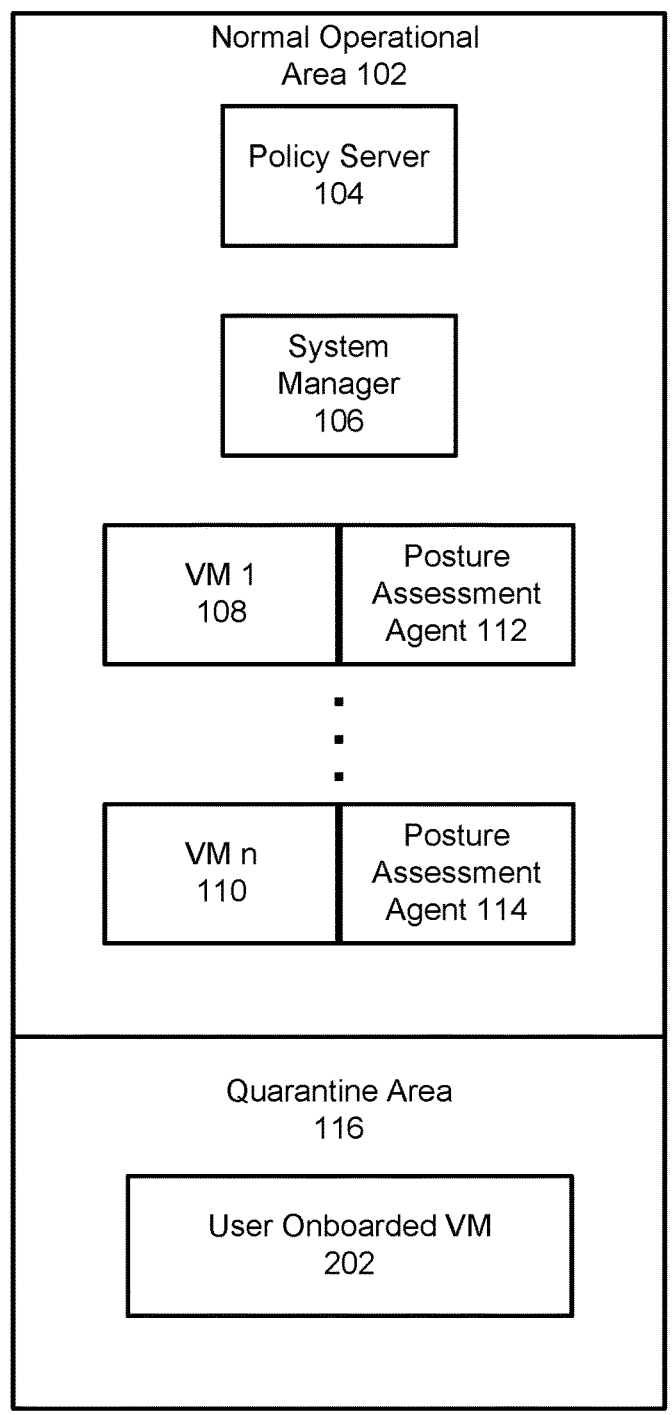
FIG. 2 is a diagram of an example unified system with a quarantined user installed VM in accordance with at least one implementation.

As shown in FIG. 2, system user may install (or load or onboard) one or more VMs (202) that are not part of the baseline factory configuration for the system 100. The system 100, through the system manager 106 and the policy server 104, detects the presence of the user installed (or onboarded) VM 202 and places the user installed VM in a quarantine area (or network) for a grace period. This permits the user installed VM to operate with limited or controlled access to other system resources and also permits the system manager 106 and policy server 104 time to complete and assessment of the newly installed VM 202.

Figure 3:
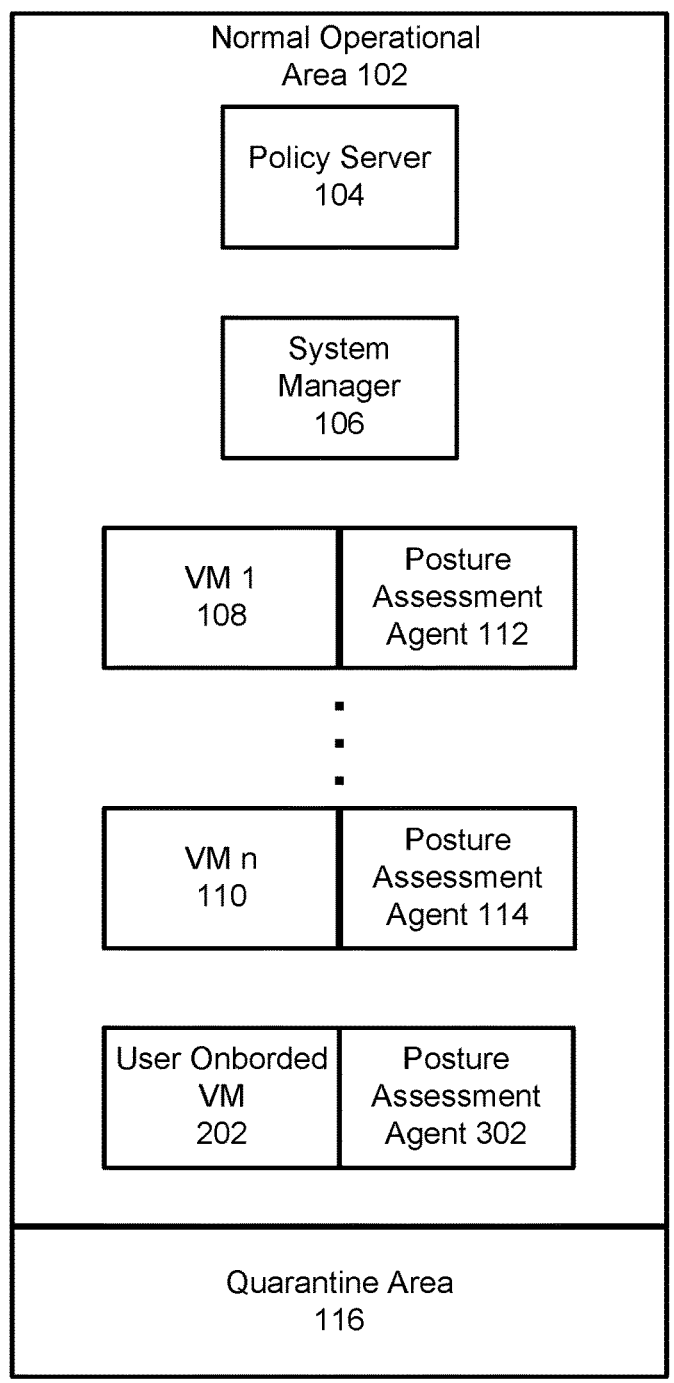
FIG. 3 is a diagram of an example unified system with an activated user installed VM in accordance with at least one implementation.

Once the assessment of a quarantined user installed VM 202 is complete and the system manager 106 and policy manager 14 determine that the VM is safe and that an appropriate license is present to activate the VM, the user installed VM 202 can be activated and moved from the quarantine area 116 to the normal operational area 102, as shown in FIG. 3. Also, a posture assessment agent 302 can be installed and configured to monitor the user installed VM 202.

Figure 4:
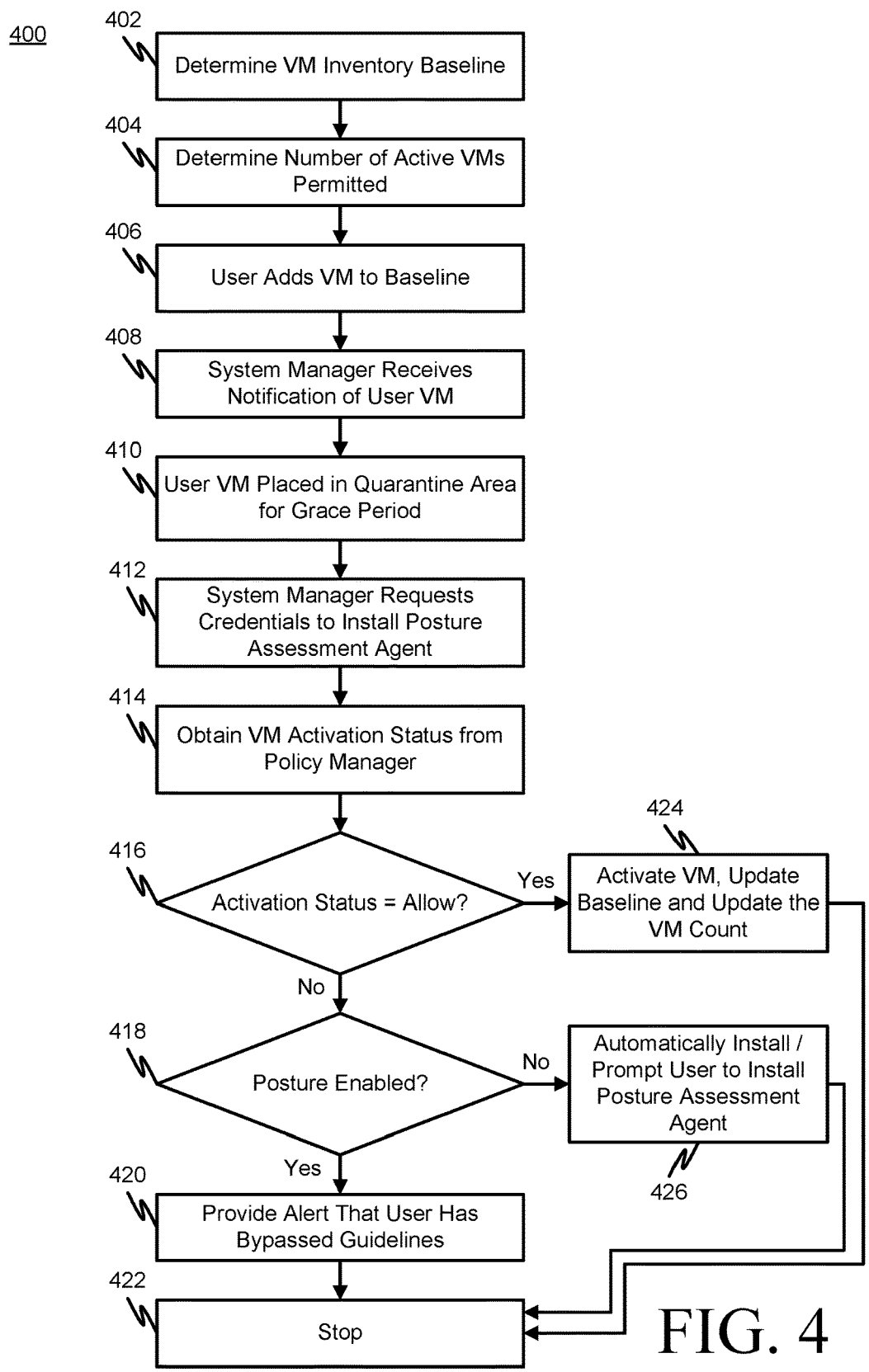
FIG. 4 is a flow chart of an example method of securely onboarding a VM in accordance with at least one implementation.

FIG. 4 is a flow chart of an example method of securely onboarding a VM in accordance with at least one implementation. Processing begins at 402, where a VM system manager (e.g., an Avaya Pod Visualization Manager) determines a baseline VM inventory. The system manager can collect information from each of the baseline VMs. The baseline VMs can include those VM installed by the factory. VMs that are part of the initial setup can be defined in the baseline and can be registered with the policy server upfront. The registration with the policy server happens as part of the initial baseline creation. In some implementations, the initial baseline creation can happen in the factory or at a customer premises. The baseline creation can include an internal process which may be transparent to the customer. The baseline creation can also be done manually by authorized personnel or using an automated process on first boot up of the system. Processing continues to 404.

At 404, the system manager determines how many of the VMs are activated and the maximum number of activated VMs permitted by the system license (e.g., VM license pack) currently in use. Processing continues to 406.

At 406, a user installs a VM in the system. The user installed VM is one that may not be included in the factory baseline VM installation. Processing continues to 408.

At 408, the system manager receives notification of the user installed VM. Processing continues to 410.

At 410, the system manager confines the user installed VM to a quarantine area or network. The quarantine area or network may have limited or restricted access to system resources and to other VMs on the system. The quarantining can be used to help reduce or eliminate the possibility of a user installed VM adversely affecting other parts of the system. Processing continues to 412.

At 412, the system manager requests credentials to install a posture assessment agent for the user installed VM. The posture assessment agent can assess the user installed VM and provide the results of the assessment to the system manager. For example, during the next audit of the system, the results of the assessment of the user installed VM may be retrieved and used to determine whether to move the user installed VM out of quarantine. In another example, when the PVM detects the presence of a new VM, the PVM can prompt the administrator who has installed this VM to provide the credentials. The credentials can be used to eventually install the posture agent on the VM, as admin privileges may be required to install any external applications on the VM. Following installation of posture assessment agent, the credentials may not be required and may be released. However, the system can use custom certificates to secure subsequent communication between the posture assessment agent and the PVM. Processing continues to 414.

At 414, the system manager communicates with the policy server to get the VM activation status of the user installed VM. For example, the system manager may send to the policy manager one or more of the following information items: unique identity of the VM, posture settings of the VM (e.g., based on the assessment by the posture assessment agent installed at 412), number of active VMs currently permitted by the license in use, and number of active VMs currently activated in the system. In some implementations the policy server can be configured to evaluate the following:

1) If the posture settings on the VM meet the required criteria. For instance, if a firewall is enabled, anti-virus is installed, etc. The policy which indicates what posture settings need to be checked for each VM can be defined in the policy server. So, the PVM can pass the posture settings on the VM to the policy server and the policy server can execute the policy and determine if the VM actually meets the posture criteria; and 2) The PVM can provide two pieces of information (e.g., current active VMs and max VMs supported based on license). The policy server can use the two pieces of information to finally determine if additional VMs can be added and, if so, how many more VMs can be activated. Evaluation of any conditions can be carried out on the policy server and the PVM just passes all the collected data. The PVM can pass data to the policy server, which can act on that data and takes a decision. Processing continues to 416.

At 416, the system determines whether the policy server indicates to allow the activation of the user installed VM. If so, processing continues to 424. If not, processing continues to 418.

At 418, the system manager determines whether an appropriate security posture is enabled for the user installed VM. If so, processing continues to 420. If not, processing continues to 426.

At 420, the system can provide an alert that a user has bypassed the recommended guidelines for VM installation in the system. The alert can be provided to the manufacturer, a service provider, a system administrator, another system (e.g., an enterprise monitoring system) or the like. Processing continues to 422, where processing stops for this cycle. It will be appreciated that 402-426 can be repeated in order to provide ongoing secure onboarding of VMs in accordance with some implementations.

At 424, the user installed VM is activated by the system manager and moved from quarantine to a normal operational area and status. Also, the VM baseline information system can be updated to reflect the activation of the user installed VM and the active VM count maintained by the system manager can be updated for license compliance purposes. Processing continues to 422.

At 426, a posture assessment agent can be automatically installed and/or a user can be prompted to install the posture assessment agent for the user installed VM. Processing continues to 422.

Figure 5:
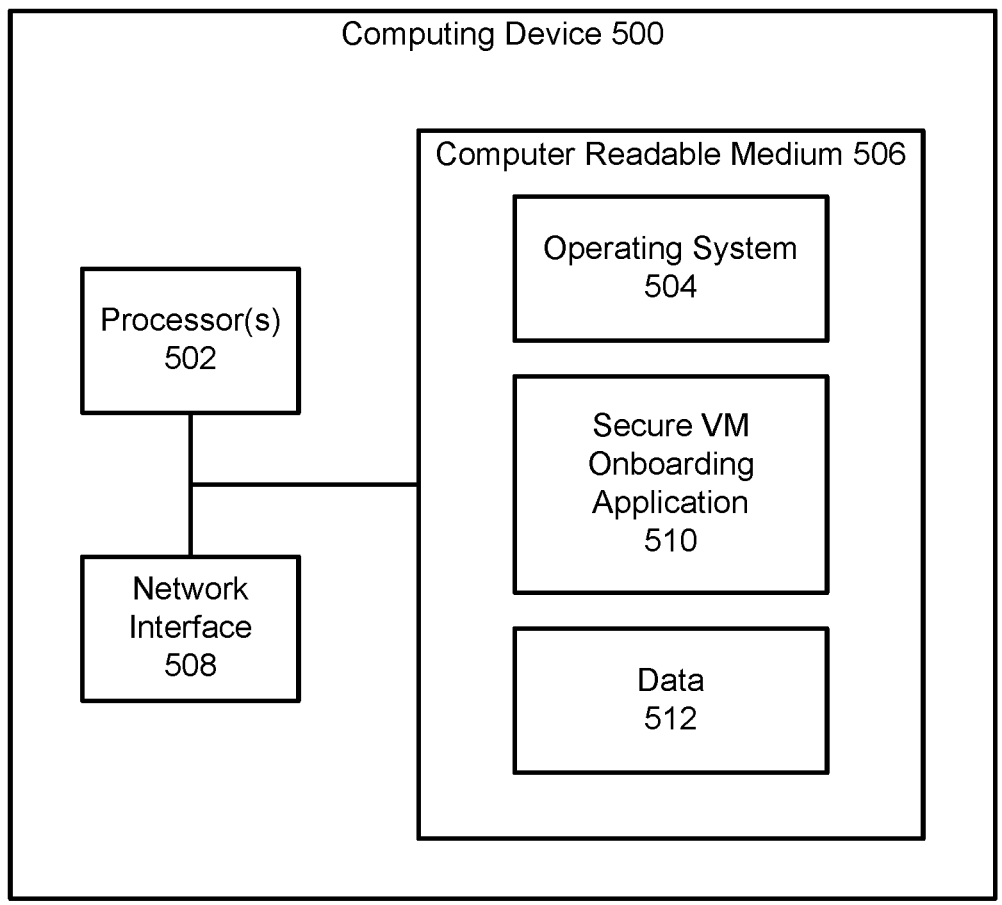
FIG. 5 is a diagram of an example computing device configured for securely onboarding a VM in accordance with at least one implementation.

FIG. 5 is a diagram of an example computing device 500 in accordance with at least one implementation. The computing device 500 includes one or more processors 502, nontransitory computer readable medium 506 and network interface 508. The computer readable medium 506 can include an operating system 504, an application 510 for securely onboarding virtual machines using a centralized policy server and a data section 512 (e.g., for storing baseline VM data, etc.).

In operation, the processor 502 may execute the application 510 stored in the computer readable medium 506. The application 510 can include software instructions that, when executed by the processor, cause the processor to perform operations for securely onboarding virtual machines using a centralized policy server in accordance with the present disclosure (e.g., performing one or more of 402-426 described above).

The application program 510 can operate in conjunction with the data section 512 and the operating system 504.

In some implementations, the unified system can provide a plurality of zones in which VMs can operate. For example, a system can provide three zones: Zone 1, Zone 2, and Zone 3. Zone 1 can be provided for standard VMs and/or applications such as those deployed and configured in the factory. Changes to the configuration of VMs and applications in Zone 1 can be performed by factory authorized technicians and/or by software configured by the factory to perform automatic upgrades to the configuration of Zone 1 VMs and/or applications.

Zone 2 can be provided for onboarded VMs or applications that have met the posture requirements for a unified system. Zone 3 can be provided as a quarantine (or sandbox) zone for customer onboarded applications that have not met the posture requirements. VMs and applications can operate in Zone 3 for a grace period and are then shut down once the grace period is over and the VMs or applications have not met the posture requirements. VMs and applications in Zone 3 may be provided with limited access to network resources and may also have limited access to unified system resources such as CPUs and memory. Zone 3 can provide an environment for testing VMs or application without affecting the VMs or applications in the other two zones.

The systems, methods and computer readable media described herein can be implemented in systems including, but not limited to, VMs, standalone desktops, servers, Linux containers, sandboxes, etc. It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for securely onboarding virtual machines using a centralized policy server.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method, comprising:
    determining a virtual machine (VM) inventory baseline of a system, wherein the determining comprises identifying VMs in a baseline configuration and generating a VM fingerprint for each VM in the VM inventory baseline;
    detecting an onboarded VM;
    determining whether the onboarded VM is in the VM inventory baseline based on the VM fingerprint;
    in response to the onboarded VM being excluded from the VM inventory baseline, setting the onboarded VM to a quarantine stat for a period of time;
    comparing an operational posture of the onboarded VM to an operational posture policy of the system;
    determining an available maximum number of virtual machines (VMs) permitted in the system according to a license and a current number of VMs in the system;
    in response to the operational posture of the onboarded VM meeting the operational posture policy of the system and in response to a determination that the current number of VMs in the system being less than the available maximum number of VMs permitted in the system, setting the onboarded VM from the quarantine state to an operational state; and
    in response to the operational posture of the onboarded VM failing to meet the operational policy posture of the system and to the period of time having expired, shutting down the onboarded VM.

2. The method of claim 1, further comprising in response to the operational posture of the onboarded VM meeting the operational posture policy of the system, updating the VM inventory baseline to include the onboarded VM and a fingerprint of the onboarded VM.

3. The method of claim 1, wherein comparing the operational posture of the onboarded VM comprises:
    assigning a posture assessment agent to the onboarded VM; and
    receiving posture assessment information from the posture assessment agent.

4. The method of claim 1, further comprising:
    in response to a determination that the number of VMs in the system is equal to or greater than the available maximum number of VMs permitted in the system, preventing the onboarded VM from being moved from the quarantine state to the operational state.

5. The method of claim 1, wherein the quarantine state comprises resources that are limited compared to the resources provided by the operational state.

6. The method of claim 1, wherein the VM fingerprint is based on one or more of a VM ID, a UUID, a MAC address, and a VM operational parameter.

7. A system, comprising:
    one or more processors coupled to a nontransitory computer readable medium having stored thereon software instructions that, when executed by the one or more processors, cause the one or more processors to perform operations comprising:
        determining a virtual machine (VM) inventory baseline of the system;
        generating a VM fingerprint for each VM in the VM inventory baseline;
        detecting an onboarded VM;
        based on the VM fingerprint, determining whether the onboarded VM is in the VM inventory baseline;

in response to the onboarded VM being excluded from the VM inventory baseline, setting the onboarded VM to a quarantine state;

determining an available maximum number of virtual machines (VMs) permitted in the system according to a license and a current number of VMs in the system;

comparing an operational posture of the onboarded VM to an operational posture policy of the system; and in response to the operational posture of the onboarded VM meeting the operational posture policy of the system and in response to a determination that the current number of VMs in the system being less than the available maximum number of VMs permitted in the system, setting the onboarded VM from the quarantine state to an operational state.

8. The system of claim 7, wherein the operations further comprise in response to the operational posture of the onboarded VM meeting the operational posture policy of the system, updating the VM inventory baseline to include the onboarded VM.

9. The system of claim 7, wherein comparing the operational posture of the onboarded VM comprises;

assigning a posture assessment agent to the onboarded VM;

receiving posture assessment information from the posture assessment agent; and in response to the operational posture of the onboarded VM failing to meet the operational policy posture of the system shutting down the onboarded VM.

10. The system of claim 7, wherein the operations further comprise:

in response to a determination that the number of VMs in the system is equal to or greater than the available maximum number of VMs permitted in the system, preventing the onboarded VM from being moved from the quarantine state to the operational state.

11. The system of claim 7, wherein the VM fingerprint is based on one or more of a VM ID, a UUID, a MAC address, and a VM operational parameter.

12. A nontransitory computer readable medium having stored thereon software instructions that, when executed by one or more processors, cause the one or more processors to perform operations comprising:

determining a virtual machine (VM) inventory baseline of a system, including generating a VM fingerprint for each VM in the VM inventory baseline;

detecting an onboarded VM;

determining whether the onboarded VM is in the VM inventory baseline based on the VM fingerprint;

in response to the onboarded VM being excluded from the VM inventory baseline, setting the onboarded VM to a quarantine state for a period of time;

comparing an operational posture of the onboarded VM to an operational posture policy of the system;

determining an available maximum number of virtual machines (VMs) permitted in the system according to a license and a current number of VMs in the system;

in response to a determination that the number of VMs in the system being equal to or greater than the maximum number of VMs permitted, preventing the onboarded VM from being moved from the quarantine state to an operational state; and in response to the operational posture of the onboarded VM failing to meet the operational posture policy of the system and to the period of time having expired, shutting down the onboarded VM.

13. The nontransitory computer readable medium of claim 12, wherein the operations further comprise in response to the operational posture of the onboarded VM meeting the operational posture policy of the system, updating the VM inventory baseline to include the onboarded VM and a fingerprint of the onboarded VM.

14. The nontransitory computer readable medium of claim 12, wherein comparing the operational posture of the onboarded VM comprises assigning a posture assessment agent to the onboarded VM and receiving posture assessment information from the posture assessment agent.

15. The system of claim 7, wherein the operations further comprise in response to the operational posture of the onboarded VM failing to meet the operational policy posture of the system and to the period of time having expired, shutting down the onboarded VM.

16. The system of claim 9, wherein the posture assessment information comprises security posture settings including a list of installed security software and a configuration of security parameter settings.

17. The nontransitory computer readable medium of claim 12, wherein the operations further comprise in response to the operational posture of the onboarded VM meeting the operational posture policy of the system, setting the onboarded VM from the quarantine state to the operational state.

* * * * *

UNITED STATES PATENT AND TRADEMARK OFFICE
CERTIFICATE OF CORRECTION

PATENT NO. : 10,511,483 B2
APPLICATION NO. : 15/162488
DATED : December 17, 2019
INVENTOR(S) : Prabhu et al.

Page 1 of 1

It is certified that error appears in the above-identified patent and that said Letters Patent is hereby corrected as shown below:

In the Claims

Claim 1, Column 10, Line 13, "quarantine stat for" should read --quarantine state for--.

Signed and Sealed this
Twenty-third Day of June, 2020

Andrei Iancu
*Director of the United States Patent and Trademark Office*